United States Patent
Panglisch et al.

(10) Patent No.: US 10,040,705 B2
(45) Date of Patent: Aug. 7, 2018

(54) FILTRATION ELEMENT

(71) Applicant: BASF SE, Ludwigshafen (DE)

(72) Inventors: Stefan Panglisch, Essen (DE); Peter Berg, Utting (DE); Georg Roeder, Tuerkheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/125,825

(22) PCT Filed: Feb. 12, 2015

(86) PCT No.: PCT/EP2015/052992
§ 371 (c)(1),
(2) Date: Sep. 13, 2016

(87) PCT Pub. No.: WO2015/124492
PCT Pub. Date: Aug. 27, 2015

(65) Prior Publication Data
US 2017/0001884 A1    Jan. 5, 2017

(30) Foreign Application Priority Data
Feb. 19, 2014    (EP) ..................................... 14155707

(51) Int. Cl.
*B01D 63/06*     (2006.01)
*C02F 1/44*      (2006.01)
(Continued)

(52) U.S. Cl.
CPC ............ *C02F 1/444* (2013.01); *B01D 61/027* (2013.01); *B01D 61/145* (2013.01);
(Continued)

(58) Field of Classification Search
CPC .......... B01D 2313/12; B01D 2313/125; B01D 2319/02; B01D 2319/022;
(Continued)

(56) References Cited

U.S. PATENT DOCUMENTS

| | | | |
|---|---|---|---|
| 5,866,001 A * | 2/1999 | Hlebovy | B01D 65/00 210/321.6 |
| 2006/0191839 A1* | 8/2006 | Howard | B01D 29/21 210/338 |

(Continued)

FOREIGN PATENT DOCUMENTS

| | | |
|---|---|---|
| EP | 0 937 492 A2 | 8/1999 |
| EP | 1 964 603 A1 | 9/2008 |

(Continued)

OTHER PUBLICATIONS

English language machine translation of WO2006012920, 9 pages, No Date.*

(Continued)

*Primary Examiner* — Pranav N Patel
(74) *Attorney, Agent, or Firm* — Oblon, McClelland, Maier & Neustadt, L.L.P.

(57) ABSTRACT

The invention relates to a element (12) for filtering fluids comprising an element housing (14), wherein at least one membrane arrangement (22) and at least one permeate collecting tube (18, 19) are arranged within the element housing (14) and wherein the at least one permeate collecting tube (18, 19) is arranged in an outer part (44) of the filtration element (12). The invention further relates to a filtration module (10) and a filtration system (11) comprising such a filtration element (12) as well as uses of such a filtration element (12).

12 Claims, 4 Drawing Sheets

(51) Int. Cl.
*B01D 61/02* (2006.01)
*B01D 65/02* (2006.01)
*B01D 61/14* (2006.01)

(52) U.S. Cl.
CPC ......... *B01D 61/147* (2013.01); *B01D 63/066* (2013.01); *B01D 65/02* (2013.01); *B01D 61/14* (2013.01); *B01D 2313/12* (2013.01); *B01D 2313/13* (2013.01); *B01D 2317/02* (2013.01); *B01D 2317/04* (2013.01); *B01D 2321/04* (2013.01); *B01D 2323/12* (2013.01)

(58) Field of Classification Search
CPC .......... B01D 2319/025; B01D 2319/04; B01D 29/117; B01D 29/118; B01D 29/23; B01D 29/35; B01D 29/232; B01D 29/237; B01D 29/353; B01D 29/356; B01D 2201/325
See application file for complete search history.

(56) References Cited

U.S. PATENT DOCUMENTS

| | | |
|---|---|---|
| 2009/0218274 A1 | 9/2009 | Sakashita et al. |
| 2010/0155334 A1 | 6/2010 | Taniguchi et al. |
| 2012/0103891 A1* | 5/2012 | Thiyagarajan ......... B01D 63/10 210/252 |
| 2013/0168307 A1* | 7/2013 | Drivarbekk ............ B01D 63/04 210/321.69 |
| 2015/0144559 A1* | 5/2015 | Taniguchi ............ B01D 63/106 210/650 |

FOREIGN PATENT DOCUMENTS

| | | |
|---|---|---|
| EP | 2 153 882 A1 | 2/2010 |
| JP | WO2013176119 * | 11/2013 |
| WO | WO 98/20962 A1 | 5/1998 |
| WO | WO 2006/012920 A1 | 2/2006 |
| WO | WO 2010/142563 A1 | 12/2010 |
| WO | WO 2011/051273 A2 | 5/2011 |
| WO | WO 2012/057900 A1 | 5/2012 |
| WO | WO 2012/146629 A1 | 11/2012 |
| WO | WO 2013/186297 A1 | 12/2013 |

OTHER PUBLICATIONS

International Search Report dated Jun. 17, 2015, in PCT/EP2015/052992 filed Feb. 12, 2015.
International Preliminary Report on Patentability dated Jun. 21, 2016 in PCT/EP2015/052992 filed Feb. 12, 2015.

* cited by examiner

FILTRATION ELEMENT

The invention relates to a filtration element for filtering fluids, such as gases or liquids, in particular raw water, comprising an element housing, wherein at least one membrane element and at least one permeate collecting tube are arranged within the element housing. The invention further relates to a filtration module and a filtration system comprising such a filtration element as well as uses of such a filtration element.

Water treatment is one of the most vital applications of filtration processes, which thus experience a strong interest not only due to global water scarcity, particularly in drought-prone and environmentally polluted areas, but also due to the continuous need for drinking water supplies and for treatment of municipal or industrial waste water. Typically water treatment relies on a combination of different methods and technologies, which depend on the intended purpose of the cleaned water as well as on the quality and degree of the contaminated or raw water.

Conventionally, water treatment is based on treatment steps, such as flocculation, sedimentation and multi media filtration. In recent years, however, membrane technologies, such as microfiltration, ultrafiltration, nanofiltration and reverse osmosis, have emerged providing more efficient and reliable filtration processes. Membrane-based processes, such as microfiltration or ultrafiltration, remove turbidity caused by suspended solids and microorganisms such as pathogens like bacteria, germs and viruses from raw water. Further significant advantages of membrane-based processes are that less chemical and no temperature treatment is required.

Common membranes for filtration are either flat shaped membranes or tubular membranes with one or more capillaries. Typically, such membranes are semi-permeable and mechanically separate permeate or filtrate and the retentate from raw water. Thus, the microfiltration and ultrafiltration membranes allow permeate, such as water, to pass and hold back suspended particles or microorganisms as retentate. In this context vital membrane parameters are the selectivity, the resistance to fouling and the mechanical stability. The selectivity is mainly determined by the pore size usually specified in terms of the exclusion limit given by the nominal molecular weight cut-off (NMWC) in Dalton (Da). The NMWC is usually defined as the minimum molecular weight of a globular molecule retained by the membrane to 90%. For example in ultrafiltration the nominal pore size lies between 50 and 5 nm and the NMWC lies between 5 and 200 kDa. In nanofiltration the pore size lies between 2 and 1 nm and the NMWC lies between 0.1 and 5 kDa. Thus, while ultrafiltration already filters bacteria, viruses and macromolecules leading to water with drinking quality, nanofiltration leads to partially demineralised water. In reverse osmosis the nominal pore size shrinks even further below 1 nm and the NMWC below 100 Da. Reverse osmosis is thus suitable for filtering even smaller entities such as salts and small organic molecules. In combining the different filtration technologies a wide variety of filtration actions can be achieved which may be adapted to a specific intended purpose.

Membranes are usually embedded in a filtration system, which allows to feed the raw water and to discharge permeate as well as concentrate. For this purpose filtration systems encompass an inlet as raw water feed and outlets to discharge permeate and the concentrate. For tubular membranes different designs of filtration systems exist.

In WO 2006/012920 A1 a filtration system for tubular membranes is described. Here the tubular membrane includes multiple capillaries, which are embedded in a porous substrate. The liquid to be filtered flows from or to at least one long inner channel of the capillaries for transporting the liquid to be filtered or filtered liquid. The tubular membrane is disposed in a tubular housing with an inlet and outlets for discharging permeate and concentrate. In particular permeate is discharged through an outlet opening located centrally along the long axis of the tubular housing.

EP 0 937 492 A2 discloses a capillary filtration membrane module comprising a filter housing with an inlet, an outlet and a membrane compartment. To discharge permeate the membrane compartment further comprises discharge lamellae, which guide the permeate to a centrally located discharge compartment.

Known filtration modules discharge permeate directly through an opening in the tube housing or indirectly through a discharge tube located within the membrane element. Particularly when indirect discharge is facilitated the discharge tube is placed in the center of the membrane element and the capillaries of the membrane element are arranged in bundles surrounding the discharge tube. One drawback of such a design in horizontal arrangement is that air trapped within the modules cannot escape and air pockets formed before start up can hardly be removed. Such air pockets further reduce the active area of the membrane and increase the risk of contamination of permeate or on the permeate side of the membrane. Another drawback is that the pressure distribution of permeate is uneven across the membrane and leads to reduced performance in filtration as well as backwash mode in which the filtration direction is reversed such that a possible fouling layer formed on the membranes surface is lifted and can be removed. Hence, there is still a need in the art to further improve filtration and backwashing properties of filtration systems.

Therefore, it is an objective of the invention to provide a filtration element, a filtration module and a filtration system that facilitate to achieve improved operation and performance characteristics. A particular object of the invention is to achieve more efficient and more effective filtration and backwash processes.

These objectives are achieved by a filtration element for filtering fluids, such as gases or liquids, in particular raw water, comprising an element housing, wherein at least one membrane element and at least one permeate collecting tube are arranged within the element housing and wherein the at least one permeate collecting tube is arranged in an outer part of the filtration element. These objects are further achieved by a filtration module and a filtration system comprising the filtration element.

Arranging the permeate collecting tube in an outer part of the filtration element allows in filtration mode as well as in backwash mode for an even flow or pressure distribution across the membrane element. In filtration mode the fluid to be filtered, preferably raw water, is fed to the membrane element and the fluid to be filtered is filtered by the membrane element. Thus retentate is held back on the retentate side of the membrane and permeate flows through from the retentate side to the permeate side of the membrane. In particular, the permeate flows towards the permeate collecting tube, which according to the present invention is arranged at the outer part of the filtration element.

Unlike known systems having the permeate collecting tube in the center of the filtration element, usually within the membrane element, the arrangement according to the invention avoids permeate having to pass through a decreasing cross-section towards the centrally located permeate collecting tube of the membrane element. As the decreasing cross-section leads to higher flow velocity towards the center and a permeate volume that increases towards the center, the pressure on the permeate side of the membrane decreases and thus the filtering effect decreases as well. Hence compared to known systems, the arrangement of the permeate collecting tube in the outer part of the filtration element balances and thus enhances the filtering action across the membrane element.

Similarly, in backwashing mode, where the flow direction is reversed, permeate is fed to the membrane in reverse direction in order to wash away retentate collected on the retentate side of the membrane. Here the arrangement according to the invention avoids back washed permeate having to pass through an increasing cross-section from a centrally located permeate collecting tube of the membrane element. As the increasing cross-section leads to lower flow velocity from the center, the pressure on the permeate side of the membrane decreases and thus the effect of backwashing decreases as well. Hence compared to known systems, the arrangement of the present invention increases the effect of backwashing.

In particular, the arrangement according to the present invention avoids the antagonistic effect of systems having a central permeate collecting tube, where on one hand the filter effect and thus the build-up of a fouling layer is higher in the outer part of the membrane element, whereas the effect of back-washing is higher in the inner part of the membrane element. Therefore, the invention provides a highly balanced filtration element, which allows for an evenly distributed filtering and back-washing across the membrane element.

In the present context the outer part of the filtration element refers to an outer circumference of the filtration element that is inside and adjacent to the element housing. In particular, the permeate collecting tube may be arranged in an annular gap between the element housing and the membrane element and/or the permeate collecting tube may at least partly be embedded in the membrane element.

The filtration element, the element housing and the membrane element can have cylindrical shape, wherein the cross-section can have any shape such as round, oval, triangular, square or some polygon shape. Preferred is a round shape, which leads to a more even flow and pressure distribution within the membrane element and avoids collection of filtered material in certain areas such as corners for e.g. square or triangular shapes.

The permeate collecting tube may also have cylindrical shape, wherein the cross-section may have any shape such as round, oval, triangular, square or some polygon shape. Preferred is a round shape, which leads to enhanced pressure resistance. Preferably the longitudinal center line of the at least one permeate collecting tube is arranged parallel to the longitudinal center line of the membrane element and the element housing. Furthermore, a cross-section of the permeate collecting tube may be chosen according to the permeate volume produced by the membrane element and pressure losses occurring in the permeate collecting tube. The diameter of the permeate collecting tube may be less than half, preferred less than a third and particularly preferred less than a quarter of the diameter of the element housing.

The permeate collecting tube and the membrane element may have different or the same shape. Preferably the permeate collecting tube and the membrane element have the same shape, particularly a round shape. Thus, the at least one permeate collecting tube can be arranged within the circumferential ring extending from the radius of the element housing to half, preferred a third and particularly preferred a quarter of the radius of the element housing.

In one embodiment the permeate collecting tube is located within the filtration element such that the permeate collecting tube at least partially touches the element housing. This allows placing the filtration element in the filtration module or system such that the permeate collecting tube is arranged substantially at the top of the filtration element in horizontal arrangement. In this context substantially at the top includes any position in the outer part of the membrane that lies within ±45°, preferred ±10° from a vertical center axis in a transverse plane of the filtration element. Here the vertical center axis in a transverse plane is perpendicular to the horizontal center axis in the transverse plane and to the longitudinal center axis extending along the long axis of the filtration element. By arranging the permeate collecting tube this way, air residing within the membrane element before start-up of the filtration module or system can be collected in the permeate collecting tube, which can then easily be vented upon start up by starting the filtration operation. In particular, air pockets can be displaced by permeate which is fed to the filtration module or system and filtered by the membrane element on start up. By releasing air from the filtration module or system the active area of the membrane element increases, thus increasing the filtering effect. Furthermore the risk of fouling due to trapped air pockets decreases and pressure surges as well as the risk of breakage of the membrane element are minimised.

In another embodiment of the filtration element at least two permeate collecting tubes may be arranged in the filtration element, particularly within the element housing. By providing more than one permeate collecting tube the output volume of permeate at a constant pressure can be increased and adjusted to the permeate volume produced by the membrane element. Furthermore the pressure loss is reduced if high backwashing flows are required. Here at least one first permeate collecting tube is arranged in the outer part of the filtration element and at least one second permeate collecting tube can be arranged in the inner or the outer part of the filtration element. For example, two permeate collecting tubes may be arranged in the outer part or one first permeate collecting tube may be arranged in the outer part and another second permeate collecting tube may be arranged in the inner part of the filtration element.

Preferably at least two permeate collecting tubes are arranged opposite each other in the outer part or the outer circumferential ring of the filtration element. By providing at least two permeate collecting tubes opposite each other in the outer part of the filtration element, the filtration element can be placed in a filtration module or system such that one of the tubes are arranged substantially at the top of the element while the other tube is arranged substantially at the bottom. This way ventilation can be achieved through the top tube, while the additional bottom tube increases output volume at a constant pressure.

In another embodiment the filtration element further comprises a perforated tube arranged around the membrane element, in particular composing at least one membrane arrangement comprising at least one hollow fibre membrane. The perforations may be formed by holes or other openings located in regular or irregular distances along the tube. Preferably, the membrane element, in particular the membrane arrangement is enclosed by the perforated tube. With the perforated tube the axial pressure distribution along the filtration element can be equalised in filtration and back washing operation. Thus, the permeate flow is evenly distributed along the filtration element and hence the filtering effect can be increased.

In another embodiment the perforated tube is arranged such that an annular gap is formed between the element housing and the perforated tube. Known membrane elements do not have a distinct border and the membrane element are directly embedded in a housing of the filtration element. This leads to an uneven pressure distribution in axial direction as the axial flow is disturbed by the membrane element. In contrast the filtration element according to the invention allows for evenly distributing the permeate flow along the filtration element and hence the filtering effect can be increased.

In another embodiment the membrane element comprises a multi bore membrane. The multi bore membrane preferably comprises more than one capillary, which runs in a channel along the longitudinal axis of the membrane element or the filtration element. Particularly, the multi bore membrane comprises at least one substrate forming the channels and at least one active layer arranged in the channels forming the capillaries. Embedding the capillaries within a substrate allows forming a multi bore membrane, which are considerably easier to mount and mechanically more stable than membranes based on single hollow fibres. As a result of the mechanical stability, the multi bore membrane is particularly suitable for cleansing by back washing, where the filtration direction is reversed such that a possible fouling layer formed in the channels is lifted and can be removed. In combination with the arrangements of the permeate colleting tube leading to an even pressure distribution within the membrane element, the overall performance and stability of the filtration element is further enhanced.

In contrast to designs with a central discharge tube and single bore membranes, the distribution of the multi bore membranes is advantageous in terms of producing lower pressure loss in both operational modes filtration and backwash. The present invention further increases stability of the capillaries by equalising the flow or pressure distribution across the membrane element. Thus, the present invention avoids adverse effects on the pressure distribution among the capillaries of the membrane element. For designs with a central permeate collecting tube permeate flows in filtration mode from the outer capillaries of the membrane to the inner capillaries and has to pass a decreasing cross-section. In backwashing mode the effect reverses in that sense, that the flow volume decreases towards the outer capillaries and thus the cleaning effect decreases towards the outside as well. In fact the uneven flow and pressure distribution within the membrane element leads to the outer capillaries having a higher flow in filtration mode and hence building up more fouling layer than the inner capillaries. In backwashing mode, however, this reverses to the contrary with a higher cleaning effect for the inner capillaries, while the outer exhibit a higher build up. Thus the combination of the permeate collecting tube in the outer part of the filtration element and the use of the multi-bore membrane synergistically lead to a higher long-term stability of the filtration element.

The substrate of the multi bore membrane can be made of at least one polymer, in particular at least one soluble thermoplastic polymer. The at least one polymer can be selected from polysulfone (PSU), polyethersulfone (PESU), polyphenylenesulfone (PPSU), polyvinylidene chloride (PVDC), polyvinylidene fluoride (PVDF), polyvinyl chloride (PVC), polyacrylonitrile (PAN), polyphenylenesulfone, polyarylether, polybenzimidazole (PBI), polyetherimide (PEI), polyphenyleneoxide (PPO), polyimide (PI), polyetherketone (PEK), polyetheretherketone (PEEK), cellulose acetate and copolymers composed of at least two monomeric units of said polymers. Preferably the at least one polymer is selected from polyethersulfone (PESU), polysulfone (PSU), polyvinylidene chloride (PVDC), polyvinylidene fluoride (PVDF), cellulose acetate, polzacrylonitrite (PAN) and copolymers composed of at least two monomeric units of said polymer. The polymer can also be selected from sulfonated polymers selected from the group consisting of polyarylether, polyethersulfone (PESU), polysulfone (PSU), polyacrylonitrile (PAN), polybenzimidazole (PBI), polyetherimide (PEI); polyphenyleneoxide (PPO), polyvinyli-denfluoride (PVDF), polyimide (PI), polyetherketone (PEK), polyetheretherketone (PEEK), polyphenylenesulfone and copolymers composed of at least two monomeric units of said polymers. Suitable polymers are also for instance described in PCT/EP2010/057591.

More preferably the at least one polymer is selected from polysulfone (PSU) and polyethersulfone (PESU).

The channels of the substrate may incorporate an active layer with a pore size different to that of the substrate or a coated layer forming the active layer. Suitable materials for the coated layer are polyoxazoline, polyethylene glycol, polystyrene, hydrogels, polyamide, zwitterionic block copolymers, such as sulfobetaine or carboxybetaine. The active layer can have a thickness in the range from 10 to 500 nm, preferably from 50 to 300 nm, more preferably from 70 to 200 nm.

Preferably the multi bore membranes utilized in the context of the present invention are designed with a pore sizes between 0.2 and 0.01 µm. In such embodiments the inner diameter of the capillaries can lie between 0.1 and 8 mm, preferred between 0.5 and 4 mm and particularly preferred between 0.9 and 1.5 mm. The outer diameter of the multi bore membrane can lie between 1 and 26 mm, preferred 2.3 and 14 mm and particularly preferred between 3.6 and 6 mm. Furthermore, the multi bore membrane can contain 2 to 94, preferably 3 to 19 and particularly preferred between 3 and 14 channels. Often multi bore membranes contain seven channels. The permeability range can lie between 100 and 10000 L/m$^2$hbar, preferably between 300 and 2000 L/m$^2$hbar.

Typically multi bore membranes of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrolidone. Non-solvent based coagulation agents are for instance water, iso-propanol and propylene glycol.

The membrane elements utilized in the context of the present invention can also be designed for microfiltration with a pore size greater 0.2 μm, for nanofiltration with a pore size between 0.01 and 0.001 μm of for reverse osmosis with a pore size of less than 0.001 μm. Particularly membranes adapted for reverse osmosis are described in WO2012/146629 or PCT/EP2013/062232. A process for producing such membranes is for instance explained in WO2011/051273.

The invention further concerns a filtration module including a module housing, wherein at least one filtration element as described above is arranged within the module housing. Hereby the filtration element is arranged vertically or horizontally. The module housing is for instance made of fibre reinforced plastic (FRP).

In one embodiment the at least one filtration element is arranged within the module housing such that the longitudinal center axis of the filtration element and the longitudinal center axis of the housing are superimposed. Preferably the filtration element is enclosed by the module housing, such that an annular gap is formed between the module housing and the element housing. The annular gap between the element housing and the module housing in operation allow for an even pressure distribution in axial direction along the filtration module.

In another embodiment the filtration element is arranged such that the at least one permeate collecting tube is located substantially at the top of the filtration module or filtration element. In this context substantially at the top includes any position in the outer part of the membrane element that lies within ±45°, preferred ±10°, particularly preferred ±5° from a vertical center axis in a transverse plane of the filtration element. Furthermore, the vertical center axis in a transverse plane is perpendicular to the horizontal center axis in the transverse plane and to the longitudinal center axis extending along the long axis of the filtration element. By arranging the permeate collecting tube this way, air residing within the filtration module or system before start up can be collected in the permeate collecting tube, which can then easily be vented upon start up by starting the filtration operation. In particular, air pockets can be displaced by permeate, which is fed to the filtration module or system on start up. By releasing air from the filtration module or system the active area of the membrane element is increased, thus increasing the filtering effect. Furthermore, the risk of fouling due to trapped air pockets decreases. Further preferred the filtration module is mount horizontally in order to orientate the permeate collecting tube accordingly.

In another embodiment the filtration element is arranged such that at least two permeate collecting tubes are arranged opposite each other in the outer part of the filtration element. In this embodiment the filtration module can be oriented such that one of the permeate collecting tubes are arranged substantially at the top of the filtration element, while the other tube is arranged substantially at the bottom of the filtration element. This way the ventilation can be achieved through the top tube, while the bottom tube allows for a higher output volume at a constant pressure. Furthermore, the permeate collecting tubes can have smaller dimensions compared to other configurations providing more space to be filled with the membrane element and thus increasing the filtration capacity.

The invention further concerns a filtration system comprising multiple filtration modules as described above connected in series. Connecting multiple filtration modules also increases the capacity of the filtration system. Preferably the filtration modules and the encompassed filtration elements are mounted horizontally and adapters are used to connect the filtration modules accordingly.

Further the present invention is directed to the use of filtration element, the filtration module and the filtration system in a ultrafiltration, microfiltration or nanofiltration process for water treatment, such as drinking water treatment, waste water treatment or seawater desalination, concentration of pharmaceutical compositions, concentration of food compositions, water reclamation from waste water, power generation and potable water reuse devices, preferably for water treatment, such as drinking water treatment, waste water treatment and seawater desalination.

BRIEF DESCRIPTION OF THE DRAWINGS

For a better understanding of the aforementioned embodiments of the invention as well as additional embodiments thereof, reference should be made to the Description of Embodiments below, in conjunction with the appended drawings showing.

Hereinafter, preferred embodiments of the present invention will be described with reference to the drawings. The drawings only provide schematic views of the invention. Like reference numerals refer to corresponding parts, elements or components throughout the figures, unless indicated otherwise.

DESCRIPTION OF EMBODIMENTS

Figure 1:
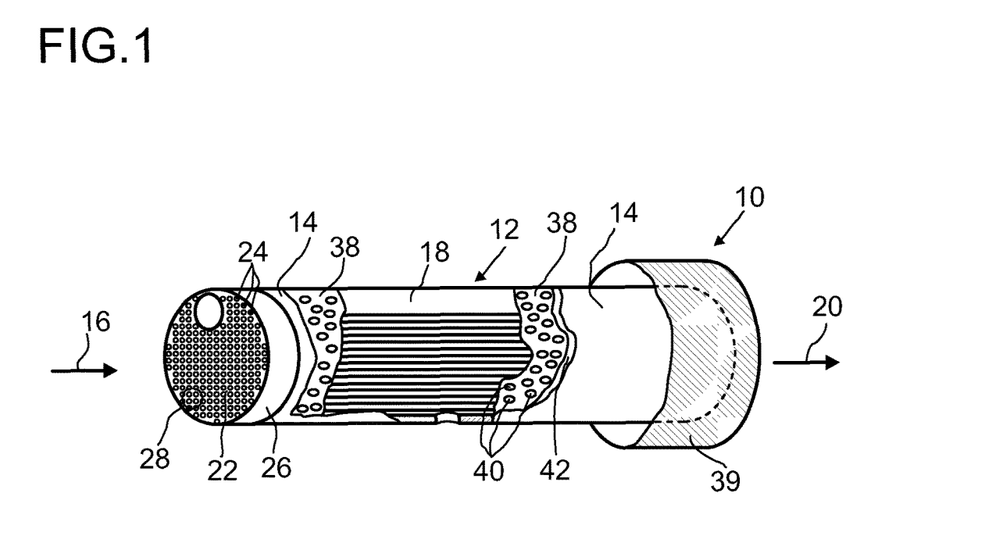
FIG. 1 a perspective view of a filtration module including one embodiment of a filtration element, FIG. 2 detailed views of a multi bore membrane of FIG. 1, FIG. 3 a perspective view of the filtration module including another embodiment of the filtration element, FIG. 4 a cross-sectional view of the filtration module including the filtration element according to FIG. 3, FIG. 5 a cross-sectional view illustrating the filtration element of FIGS. 1, 3 and 4 in filtration mode, FIG. 6 a cross-sectional view illustrating the filtration element of FIGS. 1, 3 and 4 in back-wash mode, FIG. 7 an embodiment of a filtration system comprising multiple filtration modules as shown in FIG. 1, 3 or 4 in series.

FIG. 1 shows a perspective view on a filtration module 10 including one embodiment of a filtration element 12.

The filtration module 10 includes the filtration element 12 which is arranged within a module housing 39. In the configuration shown in FIG. 1 fluid to be filtered, such as raw water, is fed to the filtration module 10 and in particular to the filtration element 12 from the left as indicated by arrow 16. The raw water is at least partly filtered through the filtration element 12 and permeate is collected in a permeate collecting tube 18. Waste water, brine or concentrate, which is not filtered through the filtration element 12, is in the configuration shown in FIG. 1 discharged to the right as indicated by arrow 20. Furthermore, raw water at least partly flows through the module housing 39 to e.g. another filtration module 10 connected in series.

The filtration element 12, which is arranged within the module housing 39, comprises an element housing 14, a multi bore membrane arrangement 22 particularly suitable for microfiltration, ultrafiltration or nanofiltration. The multi bore membrane arrangement 22 comprises several but at least one multi-bore membrane 23 explained in more detail with reference to FIG. 2. The multi-bore membrane 23 includes several capillaries 24, which act as filter medium and extend along the longitudinal axes of the filtration module 10. The element housing 14, the permeate collecting tube 18 and the multi bore membrane arrangement 22 are fixed at each end in membrane holders 26 comprising a resin preferably consisting of epoxy, in which the element housing 14, the permeate collecting tube 18 and the multi bore membrane arrangement 22 are embedded.

Figure 2:
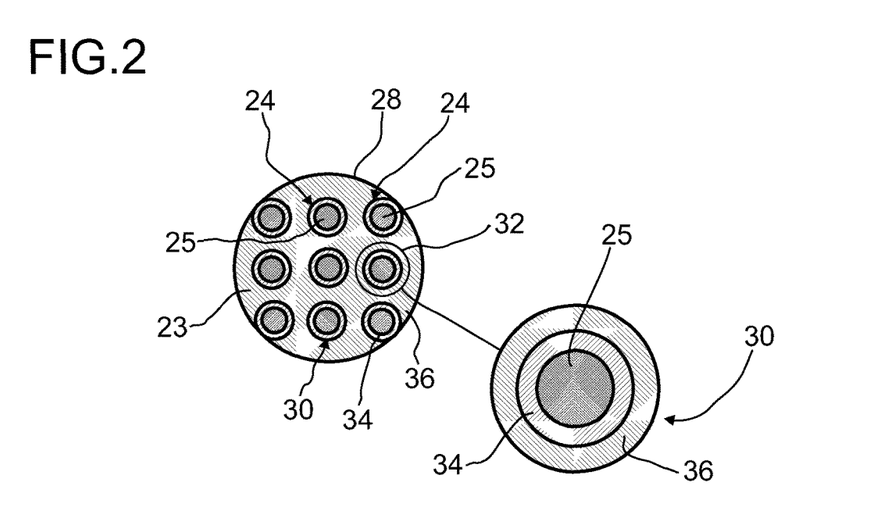

FIG. 2 shows a detailed view of a single multi bore membrane 23 as indicated by the circle 28 in FIG. 1 and a further detailed view of one capillary 24, 30 of the multi bore membrane arrangement 22 as indicated by circle 32 in FIG. 2.

The capillaries 24, 30 include a porous substrate 36 forming channels 25, which extend longitudinally along the length of the multi bore membrane arrangement 22. Inside the channels 25 an active layer 34 is arranged as filtration layer, which can either be incorporated into a substrate 36 with a different pore size or which can be formed by a coating. The capillaries 24, 30 are thus embedded in the porous substrate 36, which aids stability and avoids capillary rupture.

The porous substrate 36 of the multi bore membrane 23 is formed by a polymer, such as polysulphone type polymers, cellulose acetate, polyacrylonitrile, polyvinylidene. For example polyethersulfon or polysulfon are used to form the porous substrate 36 by extrusion, in particular by wet spinning. In wet spinning a suitable polymer is dissolved in a solvent, optionally adding additives and extruded through a spinneret for forming the multi bore membrane 23. After extrusion the membrane is coagulated and dissolvable components are removed. Such multi bore membranes 23 having an outer diameter of for instance 4 mm include for instance seven capillaries 24 with an inner diameter of 0.9 mm and a pore size of 0.02 μm. Other multi bore membranes 23 having an outer diameter of for instance 6 mm and allowing for higher sediment concentrations for instance include seven capillaries 24 with an inner diameter of 1.5 mm and a pore size of 0.02 μm.

Further with reference to FIG. 1 the multi bore membrane arrangement 22 comprises a permeate collecting tube 18, which is arranged within the filtration element 12. In particular, the permeate collecting tube 18 is arranged at an outer circumferences of the filtration element 12 and comprises a tube including openings (not shown), which allow permeate to flow into the permeate collecting tube 18 conducting the permeate out of the filtration element 12.

In operation, the filtration module 10 is oriented horizontally, and the orientation of the permeate collecting tube 18 is chosen as depicted in FIG. 1. Here the orientation is chosen such that permeate collecting tube 18 is located at the top of the filtration element 12, i.e. at the twelve o'clock position, and touches the element housing 14. This allows the filtration element 12 to be vented easily, in particular upon start-up of the filtration module 10. Furthermore, the location of the permeate collecting tube 18 provides for an even pressure distribution within the multi bore membrane arrangement 22. In particular, the cross-section of the multi bore membrane arrangement 22, which the permeate flow flows through, is not reduced and thus, the flow velocity remains even across the whole cross-section of the multi bore membrane arrangement 22. In contrast, when placing the permeate collecting tube 18 in the central part of the multi bore membrane arrangement 22 the cross-section reduces towards the central tube and the flow velocity increases, which results in a higher pressure applied to the capillaries 24 close to the central tube. Thus, the disadvantages resulting from the central location of the permeate collecting tube 18 are abandoned and an even pressure distribution in radial direction is achieved.

The filtration element 12 as depicted in the embodiment of FIG. 1 further comprises a perforated tube 38 enclosing the multi bore membrane arrangement 22. In the embodiment shown in FIG. 1 the perforated tube 38 encloses the permeate collecting tube 18. In other embodiments the perforated tube 38 encloses the permeate collecting tube 18 only partly or not at all. The perforation of the tube 38 can be of any kind. In the example of FIG. 1 the perforation comprises holes 40 in the tube 38, which allow for fluid flow. With the perforated tube 38 enclosing the multi bore membrane arrangement 22 an annular gap 42 is formed between the element housing 14 and the perforated tube 38. In operation, i.e. in filtration and back wash operation, this allows for an even distribution of water within the filtration element 12. In particular an even pressure distribution is also reached in axial flow direction.

As a result the filtration module 10 as shown in the embodiment of FIG. 1 provides an optimized filtration and back washing performance of the multi bore membrane arrangement 22. Furthermore, the radial pressure across the capillaries 24 of the multi bore membrane arrangement 22 and the axial pressure along the multi bore membrane arrangement 22 are evenly distributed, which reduces the risk of capillary rupture and increases the filtered volume.

Figure 3:
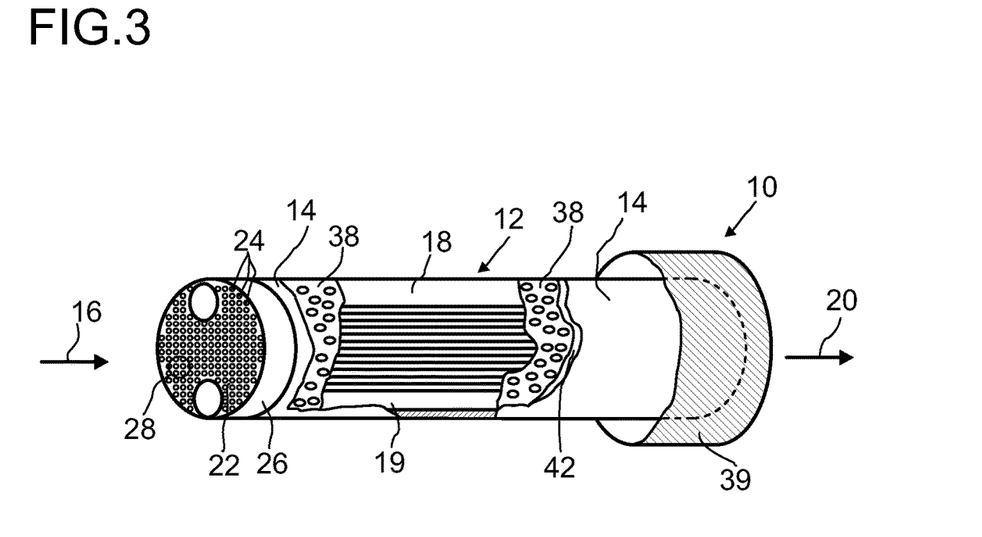

FIG. 3 shows a perspective view of a filtration module 10 including another embodiment of the filtration element 12.

The filtration module 10 shown in FIG. 3 is substantially similar to the one shown in FIG. 1. The filtration module 10 comprises a filtration element 12 embedded within a module housing 39. The filtration module 10 further includes a multi bore membrane arrangement 22 as described with reference to FIG. 2, which is located inside an element housing 14 and enclosed by a perforated tube 38 as also shown in FIG. 1.

However, in contrast to FIG. 1 the filtration element 12 of FIG. 3 comprises two permeate colleting tubes 18, 19, which are arranged at an outer circumference of the filtration element 12.

The two permeate collecting tubes 18, 19 are arranged opposite each other. For operation the filtration module 10 is mounted horizontally such that a first permeate collecting tube 18 is located at the top of the filtration element 12, i.e. in cross-sectional view at the twelve o'clock position, and a second permeate collecting tube 19 is located at the bottom of the filtration element 12, i.e. in cross-sectional view at the six o'clock position. By using two permeate collecting tubes 18, 19 as shown in FIG. 3 the output volume of permeate by constant pressure discharged from the filtration element 12 is increased, while still maintaining an even pressure distribution in axial and radial flow direction of the filtration module 10 as explained in the context of FIG. 1.

Figure 4:
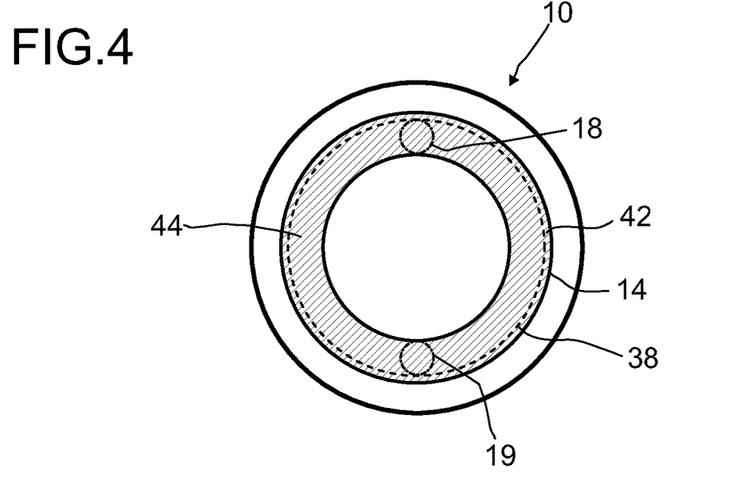

FIG. 4 shows a cross-sectional view of the filtration module 10 of FIG. 3.

The view of FIG. 4 illustrates the position of the permeate collecting tubes 18, 19 within the filtration module 10. Here the details of the multi bore membrane arrangement 22 are omitted for clarity reasons. The two permeate collecting tubes 18, 19 are arranged opposite each other in the circumferential ring 44 of the filtration element 12 inside the element housing 14. For operation, the filtration module 10 is mounted horizontally. In the horizontal orientation the location of the permeate collecting tubes 18, 19 is chosen such that the first permeate collecting tube 18 is located at the top of the filtration element 12, i.e. in cross-sectional view at the twelve o'clock position, and the second permeate collecting tube 19 is located at the bottom of the filtration element 12, i.e. in cross-sectional view at the six o'clock position.

Figure 5:
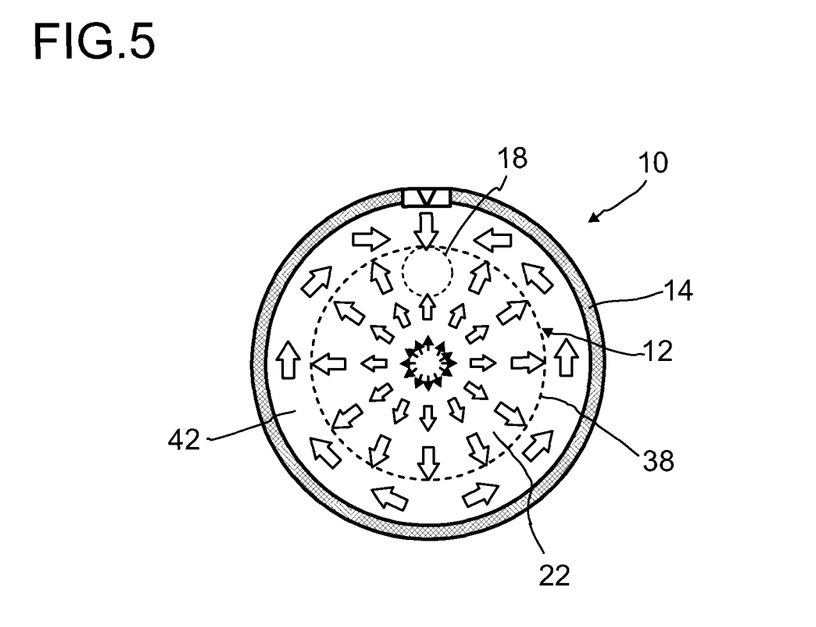

FIG. 5 shows a cross-sectional view of the filtration element 12 in filtration mode.

In filtration mode raw water is fed to the filtration module 10 as described in the context of FIGS. 1 and 3, wherein FIG. 5 exemplary illustrates the flow for one permeate collecting tube 18 at the top of the filtration element 12. Furthermore, the structure of the multi bore membrane arrangement 22 is omitted for clarity reasons.

The raw water is filtered through the multi bore membrane arrangement 22 and in particular through the active layer 34 of the capillaries 24. The filtered water is collected in the annular gap 42 between the perforated tube 38 and element housing 14 and in the permeate collecting tube 18. The permeate collecting tube 18 extends over the whole length of the filtration element 12 and also includes perforations or openings for the permeate to enter the permeate collecting tube 18. The permeate is discharged through the permeate collecting tube 18, which conducts the permeate out of the filtration module 10.

Figure 6:
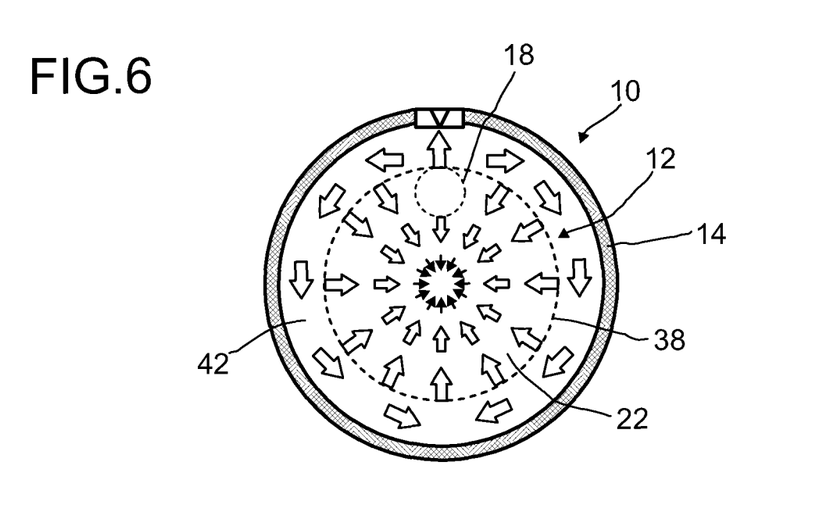

FIG. 6 shows a cross-sectional view of the filtration element 12 in back-wash mode.

In back wash mode the flow is reversed to filtration mode in order to remove retentate, such as suspended particles or microorganisms, from the capillaries 24, which can gather a fouling layer on the active layer 34 thus reducing the filtering effect. Therefore, filtered water is fed through the permeate collecting tube 18 and flows into the multi bore membrane arrangement 22 as well as the annular gap 42 between the perforated tube 38 and the element housing 14. This way the filtered water penetrates the multi bore membrane arrangement 22 in reverse direction and removes fouling layers within the capillaries 24 formed during filtration.

In both modes, i.e. in filtration and in back wash mode as depicted in FIGS. 5 and 6, the pressure on the capillaries 24 is distributed evenly. Thus the filtration can be done in an effective way loading outer and inner capillaries 24 of the multi bore membrane arrangement 22 to a similar extent and further enhance the filtration effect. At the same time the back-wash mode can be done in a more effective way, as due to the even pressure distribution, the back-washing affects inner and outer capillaries 24 in a similar way. Unlike embodiments with a central permeate collecting tube, where the effect of back-wash is inversely distributed across the capillaries 24 compared to filtration, i.e. capillaries 24 collecting more particles in filtration mode are cleaned less effectively in back-wash mode.

Figure 7:
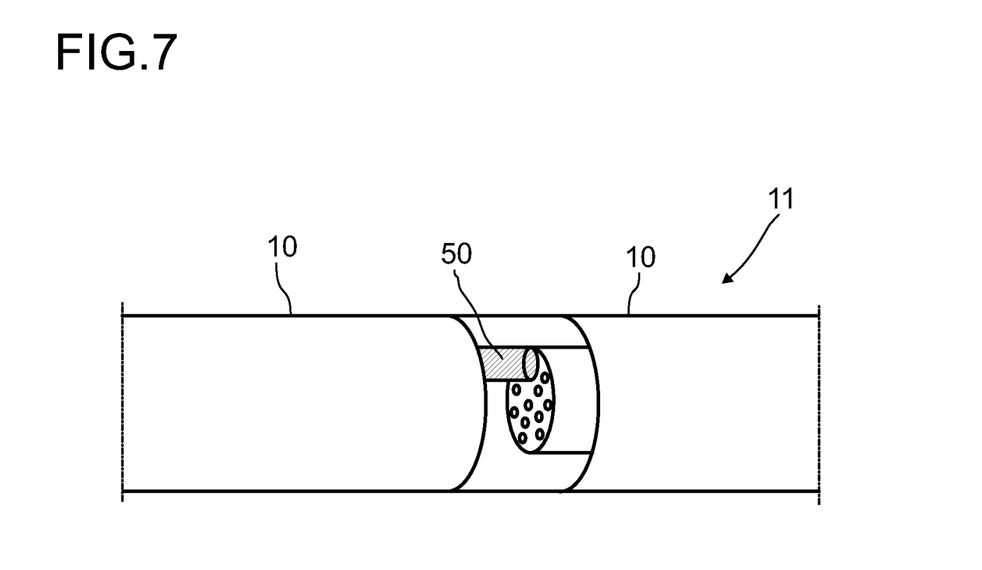

FIG. 7 shows one embodiment of a filtration system 11 comprising multiple filtration modules 10 in series.

The filtration modules 10 as described herein are particularly useful in micro-, ultra- and nanofiltration systems. In order to provide for a sufficient output volume at a constant pressure several filtration modules 10 are connected in series. Here each filtration module 10 is mounted horizontally with the same orientation of the permeate collecting tube 18 in order to provide for fluid connection over several filtration modules 10. The connection is realised by adapters 50, which connect the filtration modules 10 such that permeate can flow from one filtration module 10 to the next filtration module 10. In particular, the adapters 50 allow for permeate flow between the permeate collecting tubes 18. The detailed constructions of such adapters are known to the person skilled in the art and are therefore not described in further detail here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings and those encompassed by the attached claims. The embodiments were chosen and described in order to explain the principles of the invention and its practical applications, to thereby enable others skilled in the art to utilize the invention and various embodiments with various modifications as are suited to the particular use contemplated.

LIST OF REFERENCE NUMERALS

10 filtration module
12 filtration element
14 element housing
16 arrow indication flow direction
18 permeate collecting tube
20 arrow indication flow direction
22 multi bore membrane arrangement
23 multi bore membrane
24 capillaries
26 membrane holders
28 indication circle
30 capillary
32 indication circle
34 active layer
36 substrate
38 perforated tube
39 module housing
40 holes of the perforation
42 annular gap
44 circumferential ring

The invention claimed is:

1. A filtration system comprising multiple filtration modules arranged in series,
   wherein each of the filtration modules comprises a module housing and at least one filtration element within the module housing for filtering fluids;
   wherein the at least one filtration element comprises an element housing, at least one tubular membrane arrangement comprising multiple capillaries, and at least one permeate collecting tube;
   wherein the at least one permeate collecting tube is arranged in an outer part of the at least one filtration element arranged within the module housing;
   wherein the multiple filtration modules are mounted horizontally; and
   wherein the at least one filtration element is arranged such that the at least one permeate collecting tube is located substantially at the top of at least one of the multiple filtration modules.

2. The filtration system of claim 1, wherein the at least one permeate collecting tube is arranged within an outer circumferential ring of the at least one filtration element.

3. The filtration system of claim 1, wherein the at least one permeate collecting tube is located within the at least one filtration element such that the at least one permeate collecting tube at least partially touches the element housing.

4. The filtration system of claim 1, wherein at least two permeate collecting tubes are arranged within each element housing.

5. The filtration system of claim 4, wherein the at least two permeate collecting tubes are arranged opposite each other in the outer part of the at least one filtration element.

6. The filtration system of claim 1, wherein the at least one filtration element further comprises a perforated tube arranged around the at least one membrane arrangement.

7. The filtration system of claim 1, wherein the at least one membrane arrangement comprises at least one substrate forming channels and at least one active layer arranged in capillaries forming the channels.

8. The filtration system of claim 1, wherein the at least one membrane arrangement comprises at least one substrate forming channels and at least one active layer arranged in the capillaries that form the channels.

9. The filtration system of claim 1, wherein multiple filtration elements are arranged within the module housing in parallel.

10. The filtration system of claim 1, wherein fluid connection over the multiple filtration modules is realised by adapters that connect the multiple filtration modules such that permeate can flow from one filtration module to the next filtration module.

11. The filtration system of claim 4, wherein at least one permeate collecting tube from the at least two permeate collecting tube is arranged substantially at the bottom of the at least one filtration element.

12. An ultrafiltration process for water treatment, comprising contacting water with the filtration system of claim 1.

* * * * *

UNITED STATES PATENT AND TRADEMARK OFFICE
CERTIFICATE OF CORRECTION

PATENT NO. : 10,040,705 B2
APPLICATION NO. : 15/125825
DATED : August 7, 2018
INVENTOR(S) : Stefan Panglisch et al.

It is certified that error appears in the above-identified patent and that said Letters Patent is hereby corrected as shown below:

In the Specification

Column 6, Lines 8-9, "polzacrylonitrite" should read -- polyacrylonitrile --;

Column 6, Line 15, "polyvinyli-denfluoride" should read -- polyvinylidene fluoride --;

Column 7, Line 1, "N-methylpyrolidone." should read -- N-methylpyrrolidone. --; and Column 8, Line 35, "back-wash mode", should read -- backwash mode --.

Signed and Sealed this
Twenty-first Day of April, 2020

Andrei Iancu
*Director of the United States Patent and Trademark Office*